(12) United States Patent
Abuelsaad et al.

(10) Patent No.: US 9,986,464 B2
(45) Date of Patent: *May 29, 2018

(54) EQUITABLE AND COOPERATIVE BANDWIDTH POOLING FOR A SHARED MEDIA EVENT

(71) Applicant: INTERNATIONAL BUSINESS MACHINES CORPORATION, Armonk, NY (US)

(72) Inventors: Tamer E. Abuelsaad, Somers, NY (US); Gregory J. Boss, Saginaw, MI (US); John E. Moore, Jr., Brownsburg, IN (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/634,085

(22) Filed: Jun. 27, 2017

(65) Prior Publication Data

US 2017/0303166 A1 Oct. 19, 2017

Related U.S. Application Data

(63) Continuation of application No. 14/842,290, filed on Sep. 1, 2015, now Pat. No. 9,774,648.

(51) Int. Cl.
*H04W 28/16* (2009.01)
*H04M 15/00* (2006.01)
*H04W 84/18* (2009.01)

(52) U.S. Cl.
CPC ........... *H04W 28/16* (2013.01); *H04M 15/67* (2013.01); *H04M 15/80* (2013.01); *H04M 2215/146* (2013.01); *H04W 84/18* (2013.01)

(58) Field of Classification Search
CPC .................................................. H04J 23/0658
See application file for complete search history.

(56) References Cited

U.S. PATENT DOCUMENTS 7,792,040 B2  9/2010  Nair et al.
7,822,869 B2  10/2010 Zuckerman et al.
(Continued)

FOREIGN PATENT DOCUMENTS

WO   2012044795   4/2012
WO   2014028672   2/2014

OTHER PUBLICATIONS

Abdelnour, GM et al.; Time Clustered Access for Maximizing Bandwidth Utilization via Widows of Asynchronous Arrival; IP.com; IP.com No. 000113347; Original Publication Date Aug. 1, 1994 IBM Technical Disclosure Bulletin vol. 37, No. 8; IP.com Electronic Publication Mar. 27, 2005; pp. 207-214.

(Continued)

*Primary Examiner* — Gerald A Smarth
(74) *Attorney, Agent, or Firm* — Schmeiser, Olsen & Watts; John Pivnichny

(57) ABSTRACT

An approach is provided for pooling bandwidth provided by mobile devices in an ad hoc group. Based on information in data plans provided by wireless carriers to the mobile devices, amounts of data that will be unused at the end of respective billing cycles are estimated. Based on the estimated amounts, contributions of data from the mobile devices are determined. Based on capabilities of the mobile devices, time periods during which the respective mobile devices are subscripted for providing at least some of the respective contributions of data are determined. Hand-offs among the mobile devices are coordinated to provide a cooperative usage of the bandwidth among the mobile devices which minimizes redundant streaming or download- (Continued)

ing of content to more than one of the mobile devices. The streamed or downloaded content is presented to the ad hoc group of mobile devices.

25 Claims, 6 Drawing Sheets

(56) References Cited

U.S. PATENT DOCUMENTS

| | | | |
|---|---|---|---|
| 9,161,200 B2* | 10/2015 | Guday | H04W 24/02 |
| 9,220,123 B1 | 12/2015 | Dunne et al. | |
| 2010/0085948 A1* | 4/2010 | Yu | H04L 12/66 |
| | | | 370/338 |
| 2010/0216424 A1 | 8/2010 | Gans | |
| 2011/0125905 A1* | 5/2011 | Baucke | H04M 15/00 |
| | | | 709/226 |
| 2012/0327787 A1 | 12/2012 | Mohammed et al. | |
| 2013/0003543 A1 | 1/2013 | Ludwig | |
| 2013/0122854 A1 | 5/2013 | Agarwal et al. | |
| 2014/0018033 A1 | 1/2014 | Luna | |
| 2014/0105008 A1* | 4/2014 | Bombacino | H04L 63/105 |
| | | | 370/230 |
| 2014/0179266 A1 | 6/2014 | Schultz et al. | |
| 2014/0282777 A1 | 9/2014 | Gonder et al. | |
| 2016/0007387 A1 | 1/2016 | Adib et al. | |
| 2016/0241721 A1* | 8/2016 | Soelberg | H04M 15/09 |
| 2017/0064600 A1 | 3/2017 | Abuelsaad et al. | |
| 2017/0124737 A1 | 5/2017 | Joseph et al. | |

OTHER PUBLICATIONS

McKnight, Lee et al.; Wireless Grids—Distributed Resource Sharing by Mobile, Monadic, and Fixed Devices; IEEE Internet Computing; Jul./Aug. 2014; pp. 24-31.

MTIBAA, Abderrahmen et al.; Towards Resource Sharing in Mobile Device Clouds: Power Balancing Across Mobile Devices; MCC '13; Aug. 12, 2013; pp. 51-56.

Thilakarathna, Kanchana et al.; MobiTribe: Cost Efficient Distributed User Generated Content Sharing on Smartphones; IEEE Transactions on Mobile Computing, vol. 13, No. 9; Sep. 2014; 14 pages.

Syta, James M.; List of IBM Patents or Patent Applications Treated as Related; Jun. 27, 2017; 1 page.

\* cited by examiner

EQUITABLE AND COOPERATIVE BANDWIDTH POOLING FOR A SHARED MEDIA EVENT

This application is a continuation application claiming priority to Ser. No. 14/842,290 filed Sep. 1, 2015, now U.S. Pat. No. 9,774,648, issued Sep. 26, 2017.

TECHNICAL FIELD

The present invention relates to managing bandwidth pooling for cellular data, and more particularly to equitably pooling cellular data from several users for a single application or use.

BACKGROUND

Data usage on smartphones has been increasing year to year and current average data consumption may exceed 500 megabytes per month. Data plans for smartphone usage charge for limited amounts of data; therefore, users attempt to manage bandwidth consumption to keep costs down.

Known smartphone features track how much data is being consumed and warn the user when a particular threshold is passed. Other known techniques prevent a user's data consumption from exceeding a predefined limit. Current bandwidth sharing approaches are limited to devices that are part of a pre-specified group that are sharing a common pool of entitlement, such as a block of data across the devices each period. The known bandwidth sharing provides only limited collaboration opportunities and fails to optimize the bandwidth sharing among devices based on the devices' different data plans and different suppliers.

International Publication Number WO2012044795, entitled "System and method for managing data sharing over a hotspot network," discloses a system configured to "receive a selection of a mobile device to receive a data file, notify the mobile device of the data file to share, and transmit the data file to the mobile device in response to receiving a download request from the mobile device" in which "the mobile broadband hotspot may be directed to share the data file with other devices connected to the mobile broadband hotspot through a hotspot network without requiring the other devices to download the data file again through a wide area network." This approach avoids the need for all devices to download the file, but uses only one data plan and is therefore not a technique for sharing the usage of multiple data plans.

"Towards Resource Sharing in Mobile Device Clouds: Power Balancing Across Mobile Devices" by Abderrahmen Mtibaa et al., MCC'13, Aug. 12, 2013, discloses a Mobile Device Cloud that includes "computational offloading schemes that maximize the lifetime of the ensemble of mobile devices." The Mobile Device Cloud scheme determines a "best approach to schedule the computation among the set of devices so as to maximize their lifetime" in a localized network while power is available in the devices, but fails to describe a bandwidth consumption optimization or sharing model.

Accordingly, there is a need for a technique that equitably shares bandwidth for cellular data among multiple collaborating devices that have formed an ad hoc group, where the bandwidth is provided by multiple data plans of multiple users who are operating the respective devices.

BRIEF SUMMARY

In a first embodiment, the present invention provides a method of pooling bandwidth provided by mobile devices. The method includes a computer registering the mobile devices into an ad hoc group. The mobile devices are operated by respective users. The computer is connected to the mobile devices and to a display device. The method further includes, via the mobile devices, the computer querying accounts of the users. The accounts are managed by wireless carriers. The method further includes in response to the step of querying the accounts, the computer receiving specifications of data plans provided by the wireless carriers to the mobile devices, amounts of data remaining to be used in billing cycles specified by the data plans, numbers of days remaining in the billing cycles, and current velocities of data usage by the mobile devices. The method further includes based on the data plans, the amounts of data remaining to be used, the numbers of days remaining in the billing cycles, and the current velocities of data usage, the computer estimating amounts of data that will be unused by the mobile devices at the end of the respective billing cycles. The method further includes based on the estimated amounts, the computer determining contributions of data from the respective mobile devices so that the contributions of data do not exceed the respective estimated amounts. The method further includes the computer determining capabilities of the mobile devices, including radio interface, signal to noise ratio, signal strength, effective transmission rate, and battery life of each mobile device. The method further includes based on the capabilities of the mobile devices, the computer determining time periods during which the respective mobile devices are subscripted for providing at least some of the respective contributions of data. The method further includes the computer coordinating hand-offs among the mobile devices, which includes instructing the mobile devices to start and stop collections of data from a streaming or a downloading of content during the respective time periods and in amounts not exceeding the respective contributions. The hand-offs provide a cooperative usage of the bandwidth among the mobile devices which minimizes redundant streaming or downloading of the content to more than one of the mobile devices. The method further includes, in response to the step of coordinating the hand-offs, the computer presenting the streamed or downloaded content to the ad hoc group on the display device.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of pooling bandwidth provided by mobile devices. The method includes the computer system registering the mobile devices into an ad hoc group. The mobile devices are operated by respective users. The computer system is connected to the mobile devices and to a display device. The method further includes, via the mobile devices, the computer system querying accounts of the users. The accounts are managed by wireless carriers. The method further includes in response to the step of querying the accounts, the computer system receiving specifications of data plans provided by the wireless carriers to the mobile devices, amounts of data remaining to be used in billing cycles specified by the data plans, numbers of days remaining in the billing cycles, and current velocities of data usage by the mobile devices. The method further includes based on the data plans, the amounts of data remaining to be used, the numbers of days remaining in the billing cycles, and the current velocities of data usage, the computer system estimating amounts of data that will be unused by the mobile devices at the end of the respective billing cycles. The method further includes based on the estimated amounts, the computer system determining contributions of data from the respective mobile devices so that the contributions of data do not exceed the respective estimated amounts. The method further includes the computer system determining capabilities of the mobile devices, including radio interface, signal to noise ratio, signal strength, effective transmission rate, and battery life of each mobile device. The method further includes based on the capabilities of the mobile devices, the computer system determining time periods during which the respective mobile devices are subscripted for providing at least some of the respective contributions of data. The method further includes the computer system coordinating hand-offs among the mobile devices, which includes instructing the mobile devices to start and stop collections of data from a streaming or a downloading of content during the respective time periods and in amounts not exceeding the respective contributions. The hand-offs provide a cooperative usage of the bandwidth among the mobile devices which minimizes redundant streaming or downloading of the content to more than one of the mobile devices. The method further includes, in response to the step of coordinating the hand-offs, the computer system presenting the streamed or downloaded content to the ad hoc group on the display device.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of pooling bandwidth provided by mobile devices. The method includes the computer system registering the mobile devices into an ad hoc group. The mobile devices are operated by respective users. The computer system is connected to the mobile devices and to a display device. The method further includes, via the mobile devices, the computer system querying accounts of the users. The accounts are managed by wireless carriers. The method further includes in response to the step of querying the accounts, the computer system receiving specifications of data plans provided by the wireless carriers to the mobile devices, amounts of data remaining to be used in billing cycles specified by the data plans, numbers of days remaining in the billing cycles, and current velocities of data usage by the mobile devices. The method further includes based on the data plans, the amounts of data remaining to be used, the numbers of days remaining in the billing cycles, and the current velocities of data usage, the computer system estimating amounts of data that will be unused by the mobile devices at the end of the respective billing cycles. The method further includes based on the estimated amounts, the computer system determining contributions of data from the respective mobile devices so that the contributions of data do not exceed the respective estimated amounts. The method further includes the computer system determining capabilities of the mobile devices, including radio interface, signal to noise ratio, signal strength, effective transmission rate, and battery life of each mobile device. The method further includes based on the capabilities of the mobile devices, the computer system determining time periods during which the respective mobile devices are subscripted for providing at least some of the respective contributions of data. The method further includes the computer system coordinating hand-offs among the mobile devices, which includes instructing the mobile devices to start and stop collections of data from a streaming or a downloading of content during the respective time periods and in amounts not exceeding the respective contributions. The hand-offs provide a cooperative usage of the bandwidth among the mobile devices which minimizes redundant streaming or downloading of the content to more than one of the mobile devices. The method further includes, in response to the step of coordinating the hand-offs, the computer system presenting the streamed or downloaded content to the ad hoc group on the display device.

Embodiments of the present invention optimally manage bandwidth contributions among multiple users for content consumption in a distributed data download or streaming system. Embodiments of the present invention manage the contributions of bandwidth based on a dynamic determination of whether each user who has indicated a commitment of a bandwidth contribution for the streaming or download of content has a cognitive focus on the content that has been interrupted. The relative participation of the users determines changes in the users' bandwidth contributions.

DETAILED DESCRIPTION

Overview

Embodiments of the present invention enable pooling of cellular data among multiple users for a single application or use that provides a shared media event (e.g., downloading a live event video or pre-recorded content) by managing simultaneous connections to multiple mobile devices and determining (1) when and for how long each users' mobile device is subscripted for data usage, (2) the coordination of hand-offs between the mobile devices, and (3) the amount of data that is buffered. In one embodiment, a key fob having a High-Definition Multimedia Interface (HDMI) is an aggregator device coupled to a display device, such as a high definition television, that performs the aforementioned management tasks. In other embodiments, the aggregator device uses an interface other than HDMI. The pooling of the data may be based on fixed predefined amounts or a fixed percentage of the overall consumed amount of data.

In another embodiment, cellular data is equitably pooled among the multiple users based on each user's (1) initial commitment to a bandwidth contribution, (2) cognitive attention to the content being delivered and presented, and (3) participation in the content consumption. A user's contribution may be capped by a predefined maximum amount. By managing the users' contributions based on their relative participation, embodiments of the present invention protect a user who is unable to fully participate in the content consumption from being disproportionately drained of data entitlement.

System for Managing Bandwidth Pooling

Figure 1:
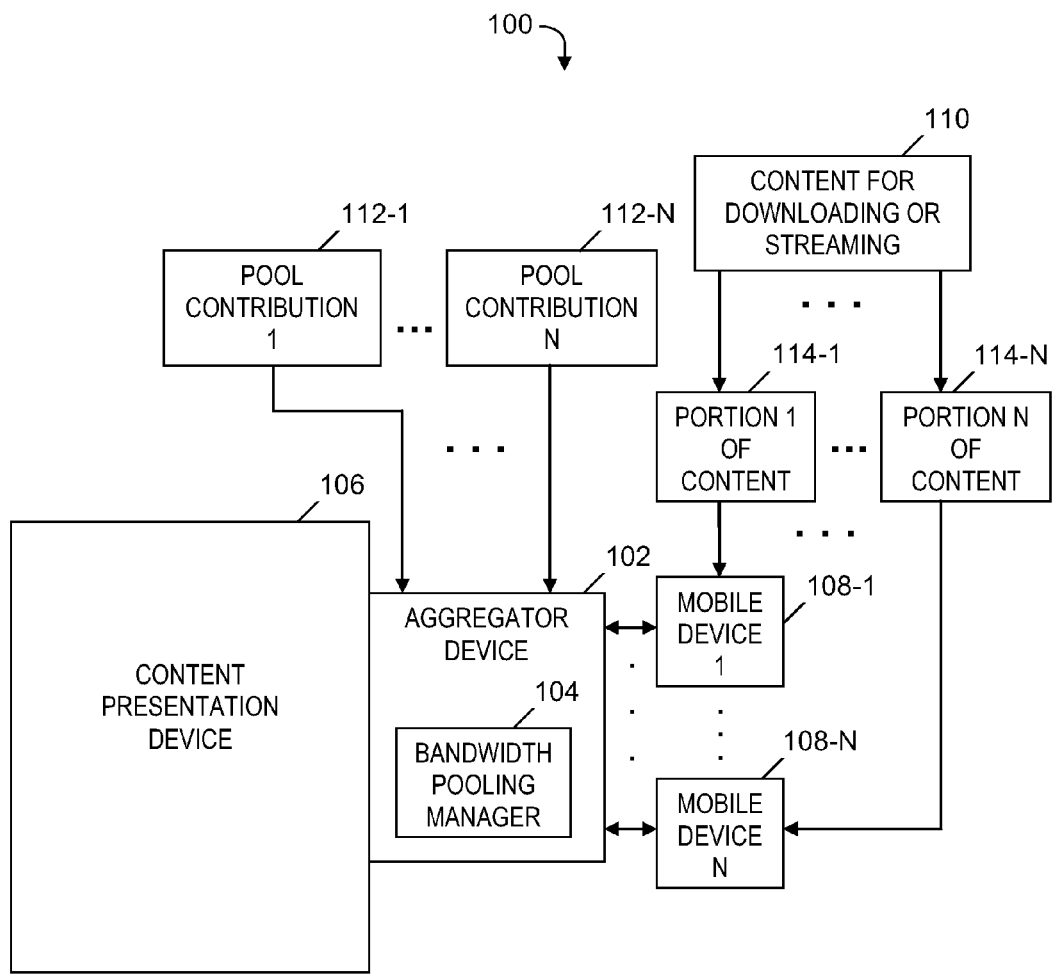
FIG. 1 is a block diagram of a system for managing bandwidth pooling, in accordance with embodiments of the present invention.

FIG. 1 is a block diagram of a system 100 for managing bandwidth pooling, in accordance with embodiments of the present invention. System 100 includes an aggregator device 102, which is a computer executing a software-based bandwidth pooling manager 104. Aggregator device 102 is coupled to a content presentation device 106 and is connected via a wireless network (not shown) to N mobile devices, which are mobile device 108-1, . . . , mobile device 108-N (i.e., mobile device 1, . . . , mobile device N, respectively), where N is an integer greater than or equal to two. Alternately, aggregator device 102 is substituted with bandwidth pooling manager 104 being executed in one of the N mobile devices, which also acts as content presentation device 106. Mobile device 1, . . . , mobile device N register with bandwidth pooling manager 104 to form an ad hoc group of mobile devices, which indicates that user 1, . . . , user N who operate mobile device 1, . . . , mobile device N, respectively, authorize a pooling of bandwidth from respective data plans of users 1, . . . , N, so that the users may simultaneously view content 110 (i.e., content stored in a media file) on content presentation device 106.

System 100 includes pool contribution 112-1, . . . , 112-N (i.e., pool contribution 1, . . . , pool contribution N), which are contributions of bandwidth to a bandwidth pool. Pool contributions 1, . . . , N are authorized by users 1, N (not shown), respectively. In one embodiment, bandwidth pooling manager 104 determines the amounts of the pool contributions 1, . . . , N, which may be all equal amounts, or may be different amounts based in part on the respective data plans of mobile devices 1, N and the usage of cellular data by mobile devices 1, . . . , N. Bandwidth pooling manager 104 receives entries from users 1, . . . , N, which approve or modify the pool contributions 1, . . . , N, respectively.

Bandwidth pooling manager 104 instructs a computer system or service (not shown) to download or stream content 110 in N portions (i.e., chunks of data): portion 114-1, . . . , portion 114-N (i.e., portion 1, . . . , portion N), which are sent to mobile device 1, . . . , mobile device N, respectively. Bandwidth pooling manager determines the amounts of data in portions 1, . . . , N based on respective pool contributions 1, . . . , N. Bandwidth pooling manager 104 coordinates buffering of portions 1, . . . , N and the timing of hand-offs among mobile devices 1, . . . , N.

Bandwidth pooling manager 104 monitors users 1, . . . , N and/or mobile devices 1, . . . , N to determine a likelihood that each user is cognitively detecting content 110 being presented on content presentation device 106. Bandwidth pooling manager 104 determines the cognitive detection of a particular user operating one of the mobile devices 1, . . . N based on any combination of (1) receiving data from a Global Positioning System (GPS) included in the mobile device operated by the user to track a distance between the mobile device and content presentation device 106; (2) receiving an indication that a presentation of content 110 on content presentation device 106 is activated, deactivated, or reactivated; (3) receiving a user selection from the mobile device that the user is opting out of the ad hoc group; (4) determining that the mobile device is out of range of a network via which portions 1, . . . , N of content 110 are being sent to content presentation device 106; and (5) receiving data from a camera (not shown) or other sensor (not shown) installed on content presentation device 106, where the camera or other sensor detects whether respective faces or eye gazes of the users 1, . . . N are present or configured so that the users are likely to be viewing or able to view content 110 being presented on content presentation device 106.

Figure 2:
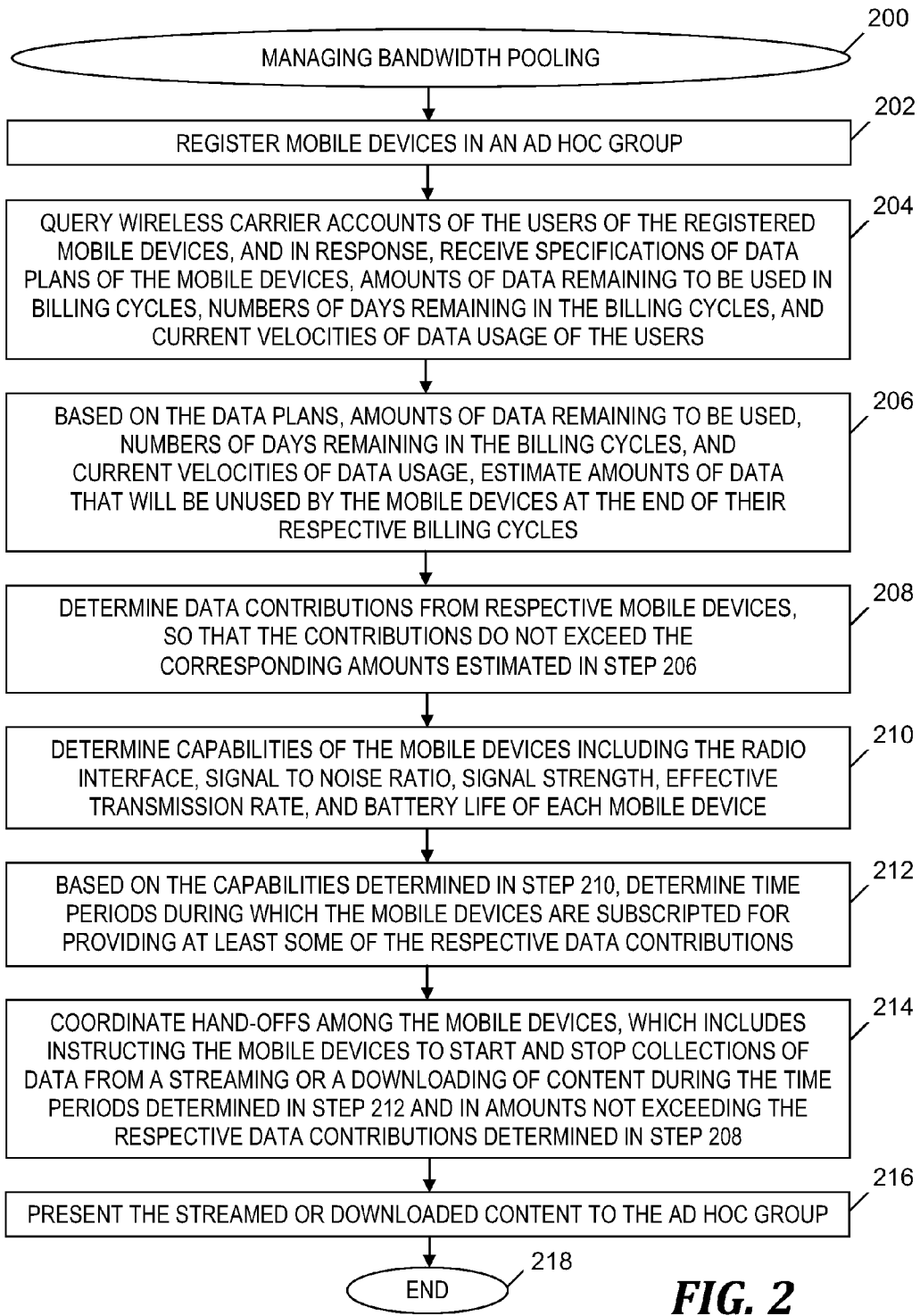
FIG. 2 is a flowchart of a process of managing bandwidth pooling, where the process is implemented in the system of FIG. 1, in accordance with embodiments of the present invention.
Figure 3:
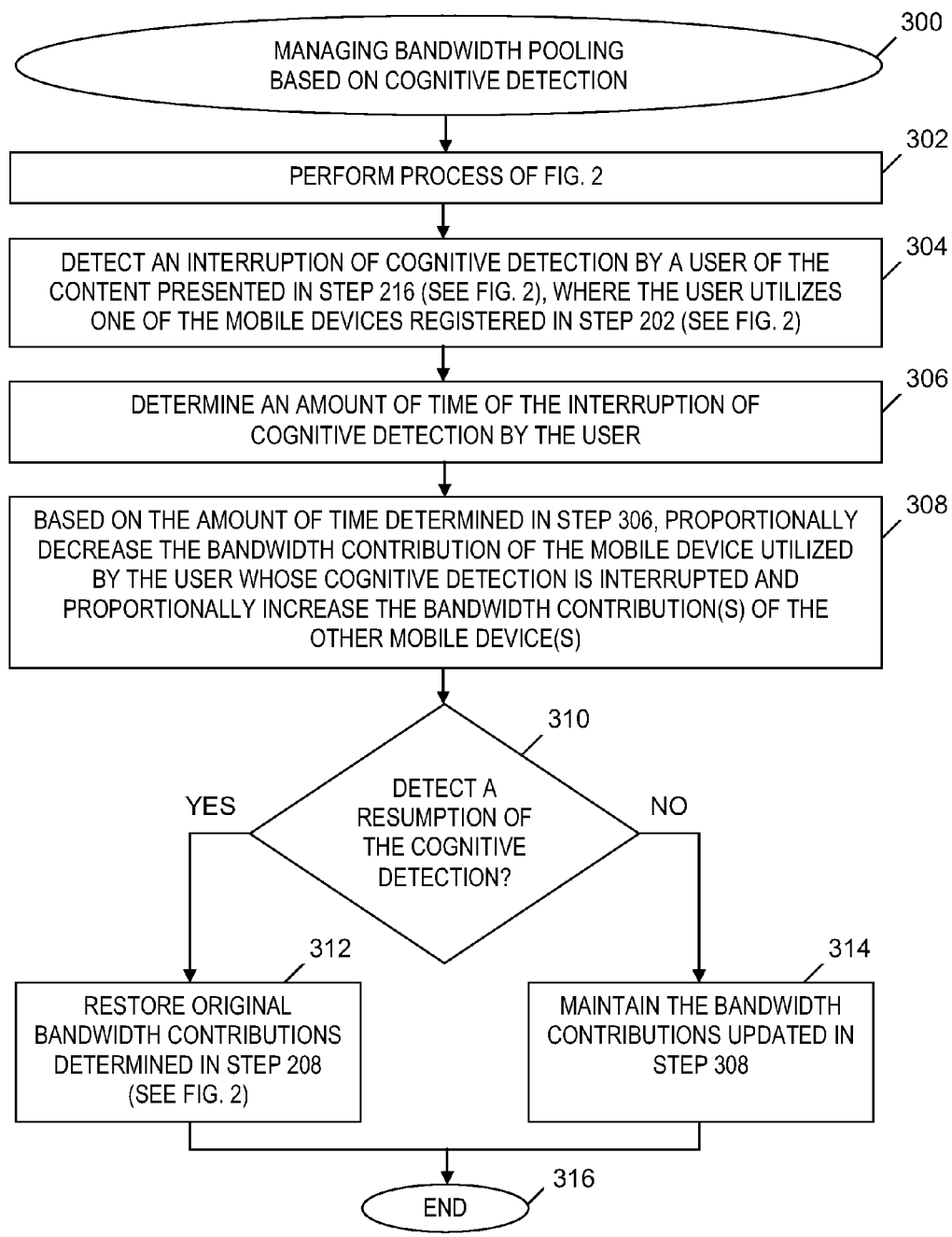
FIG. 3 is a flowchart of a process of managing bandwidth pooling based on cognitive detection, where the process includes the process of FIG. 2 and is implemented in the system of FIG. 1, in accordance with embodiments of the present invention.
Figure 5:
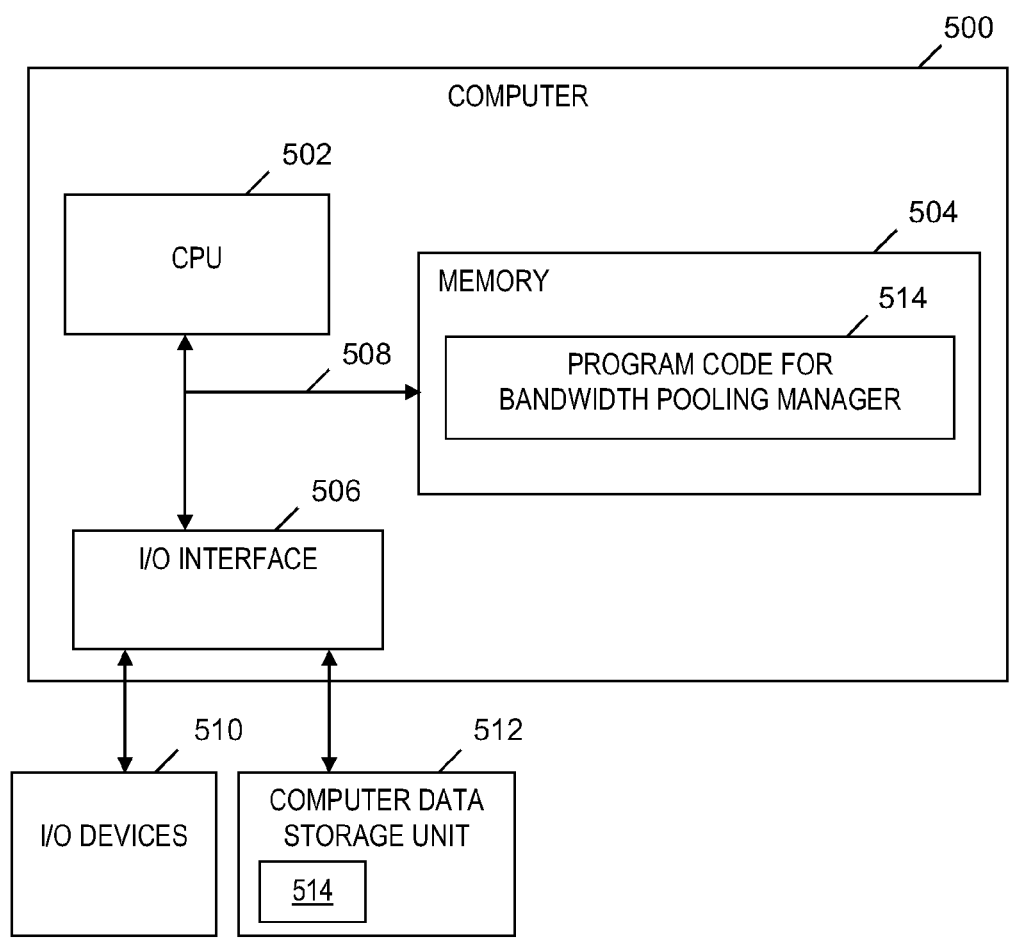
FIG. 5 is a block diagram of a computer that is included in the system of FIG. 1 and that implements the processes of FIG. 2 and FIG. 3, in accordance with embodiments of the present invention.

The functionality of the components shown in FIG. 1 is described in more detail in the discussion of FIG. 2, FIG. 3, and FIG. 5 presented below.

Process for Managing Bandwidth Pooling

FIG. 2 is a flowchart of a process of managing bandwidth pooling, where the process is implemented in the system of FIG. 1, in accordance with embodiments of the present invention. The process of managing bandwidth pooling starts at step 200. In step 202, bandwidth pooling manager 104 (see FIG. 1) registers mobile device 108-1 (see FIG. 1), . . . , mobile device 108-N (see FIG. 1) in an ad hoc group of mobile devices. Hereinafter, in the discussion of FIG. 2, the mobile devices registered in step 202 are also referred to simply as "the mobile devices."

In step 204, bandwidth pooling manager 104 (see FIG. 1) queries wireless carrier accounts of the mobile devices registered in step 202. In response to querying the wireless carrier accounts, bandwidth pooling manager 104 (see FIG. 1) receives (1) specifications of data plans of respective mobile devices registered in step 202, (2) amounts of data remaining to be used in billing cycles specified in the data plans, (3) numbers of days remaining in the billing cycles, and (4) current velocities of data usage of respective mobile devices.

In step 206, based on the specifications of data plans, amounts of data remaining to be used in the billing cycles, numbers of days remaining in the billing cycles, and current velocities of data usage of the mobile devices, which were received in step 204, bandwidth pooling manager 104 (see FIG. 1) estimates amounts of data that will be unused by the mobile devices at the end of the respective billing cycles of the mobile devices.

In step 208, bandwidth pooling manager 104 (see FIG. 1) determines bandwidth contributions (i.e., data contributions) from respective mobile devices, so that the bandwidth contributions do not exceed the respective amounts estimated in step 206.

In step 210, bandwidth pooling manager 104 (see FIG. 1) determines capabilities of the mobile devices including the radio interface, signal to noise ratio, signal strength, effective transmission rate, and battery life.

In step 212, based on the capabilities of the mobile devices determined in step 210, bandwidth pooling manager 104 (see FIG. 1) determines time periods during which respective mobile devices registered in step 202 are subscripted for providing at least some of the respective bandwidth contributions determined in step 208.

In step 214, bandwidth pooling manager 104 (see FIG. 1) coordinates hand-offs among the mobile devices, which includes instructing the mobile devices to start and stop collections of data from a streaming or a downloading, where the data is in portions 114-1, . . . , 114-N (see FIG. 1) of content 110 (see FIG. 1). The start and stop of the collections of data are during the time periods determined in step 212. The collections of data are in amounts that do not exceed the amounts of data indicated by the respective contributions determined in step 208.

In step 216, bandwidth pooling manager 104 (see FIG. 1) presents the streamed or downloaded content to users of the mobile devices on content presentation device 106 (see FIG. 1).

The process of FIG. 2 ends at step 218.

In one embodiment, aggregator device 102 (see FIG. 1) is a HDMI key fob that handles the tasks of coordinating hand-offs among mobile devices 108-1, . . . , 108-N (see FIG. 1) in step 214 and multiplexing multiple streams to the mobile devices into a single stream presented by content presentation device 106 (see FIG. 1) in step 216. The HDMI key fob has a WiFi Access Point or multiplexed WiFi Direct connections to which multiple mobile devices 108-1, . . . , 108-N (see FIG. 1) may connect. The key fob coordinates among the multiple mobile devices as to the particular packets of data being requested from each mobile device and the particular length of time that the packets of data are being requested. In response to mobile device 108-1 (see FIG. 1) initially connecting to the key fob, the user of mobile device 108-1 (see FIG. 1) authenticates the connection. The key fob subsequently communicates in step 204 via mobile device 108-1 to the cellular provider's authenticated tower and queries the tower for system load. The key fob in step 204 queries the user's account to determine the data plan provided by the cellular provider, how much data is left, how many days are left in the billing cycle, and the user's current velocity of data usage. The key fob determines in step 206 how much data will be unused at the end of the current billing cycle and presents a dialog to the user with that amount of unused data as a suggested maximum amount. Using the key fob's calculations as a guide, the user then decides how much data to contribute (i.e., pool contribution 112-1 in FIG. 1) in step 208.

After all users of mobile devices 108-1, . . . , 108-N (see FIG. 1) commit in step 208 to a contribution included in pool contributions 112-1, . . . , 112-N (see FIG. 1), the key fob uses the cell tower queries of each user to determine a bandwidth capability in step 210. The key fob continuously evaluates the amount of bandwidth available by measuring the user's signal to noise ratio, signal strength, and number of channels that have been bonded. The key fob in step 214 begins coordinating seamless hand-offs between mobile devices 108-1, . . . , 108-N (see FIG. 1). During the hand-offs, the key fob determines the appropriate cache size and multiplexes the signal, with one mobile device buffering the tail end of a break point, while another mobile device buffers the front end of the break point. The key fob then demuxes the input streams and continues pulling data for the prescribed length of time.

As one example, a group of four friends want to watch a 20 minute video of 300 MB at high definition quality. Bandwidth pooling manager 104 (see FIG. 1) coordinates the joining of the four friends' smartphones so that each smartphone will contribute 75 MB of data (i.e., the total contribution is 4×75 MB or 300 MB, which is the size of the video). The four smartphones register with an HDMI key fob attached to a nearby television. Mobile pooling manager 104 (see FIG. 1) asks each smartphone to contribute a certain percentage of downstream data from the network which is transferred to the HDMI key fob. Alternatively, one smartphone can incorporate the capabilities of the HDMI key fob and participate as a master device providing the coordination of the viewing of the video, and act as one of the contributing smartphones.

As another example, the World Cup sporting event is taking place, and ten friends (i.e., Friend 1, . . . , Friend 10) are at a party at a state park where no WiFi is available. All ten of the friends have smartphones which could stream the World Cup, but none of the friends wants to individually incur all of the charges of consuming the content of the World Cup via only one of the smartphones and drain the data entitlement of the data plan associated with the smartphone. Each of the ten friends, however, is willing to contribute an amount of data towards a live streaming of a portion of the World Cup, but not an amount of data that is sufficient for the full event. Friend 1 launches the bandwidth pooling manager 104 (see FIG. 1), identifies the video, and invites the nine other friends (i.e., Friend 2, . . . , Friend 10) to join Friend 1 in an ad hoc group. Upon joining the group, bandwidth pooling manager 104 (see FIG. 1) presents each friend an estimate of the amount of data the friend will need to contribute. Each of the friends opts in and authorizes the estimated contribution of data. Friend 1 starts streaming the World Cup and bandwidth pooling manager 104 (see FIG. 1) cycles through each of the friends and periodically repeats the cycling to consume bandwidth in an equitable manner.

Determine Optimal Distributed Collection of Data

In one embodiment, bandwidth pooling manager 104 (see FIG. 1) determines an optimal distributed collection of data. After registering mobile devices 108-1, . . . , 108-N (see FIG. 1) in step 202, bandwidth pooling manager 104 (see FIG. 1) allows the users of mobile devices 108-1, . . . , 108-N (see FIG. 1) to opt in to a set amount of data (e.g., 50 MB) determined in step 208 or by stating how much data the users are willing to contribute. After allowing the users to opt in, bandwidth pooling manager 104 (see FIG. 1) evaluates in step 210 the capabilities of mobile devices 108-1, . . . , 108-N (see FIG. 1), which include radio capability (e.g., 3G, 4G, etc.), effective speed, signal strength, battery life, etc. After step 210, and prior to step 214, bandwidth pooling manager 104 (see FIG. 1) sets up a communication pathway between mobile devices 108-1, . . . , 108-N (see FIG. 1) (e.g., a communication pathway using WiFi or Bluetooth® wireless technology, where Bluetooth is a registered trademark of Bluetooth SIG, Inc.).

After setting up the communication pathway, bandwidth pooling manager 104 (see FIG. 1) elects a master from the ad hoc group registered in step 202 and sets all other members of the group as slaves. Alternatively, bandwidth pooling manager 104 (see FIG. 1) prompts the users to turn their attention to a different device to consume the next block of content 110 (see FIG. 1).

After electing the master and slave, bandwidth pooling manager 104 (see FIG. 1) sends each of mobile devices 108-1, . . . , 108-N (see FIG. 1) the destination data, file, or endpoint which the device will be downloading. Bandwidth pooling manager 104 (see FIG. 1) sends signals to each of the slaves to start and stop collection of data in step 214.

Determine when and for What Length of Time Each Contributing Member Will Consume Data In one embodiment, bandwidth pooling manager 104 (see FIG. 1) determines a size of the download of content 110 (see FIG. 1). After determining the size of the download, bandwidth pooling manager 104 (see FIG. 1) determines the users who opted in for specific data amounts. After determining the users who opted in, bandwidth pooling manager 104 (see FIG. 1) utilizes the capabilities determined in step 210 to place mobile devices having slower download speeds as first in a queue, if all other attributes of the mobile devices are equal. This queueing allows a proper upfront buffering to occur without interruption.

If portion 114-1, . . . , portion 114-N (see FIG. 1) are not equal, then bandwidth pooling manager 104 (see FIG. 1) places the mobile devices offering larger data chunks (i.e., the larger of portions 114-1, . . . , 114-N (see FIG. 1)) at the start of the queue, all other attributes of the mobile devices being equal.

If a user indicates that the user must leave the group before the end of the download, then bandwidth pooling manager 104 (see FIG. 1) places the mobile device of the user who must leave first in the queue to leverage the data from the mobile device before that user leaves the group.

A software application on each of mobile devices 108-1, . . . , 108-N receives a signal from a second source indicating when to start downloading portions of content 110 (see FIG. 1) and when to stop, where the start and stop times are determined in step 212. Each software application starts and stops the download of a corresponding portion of content 110 (see FIG. 1) at the time designated in the time period determined in step 212.

Coordinate Multiplexed Hand-Offs

In one embodiment, bandwidth pooling manager 104 (see FIG. 1) manages a breaking up of the file containing content 110 (see FIG. 1) into predetermined size chunks and an assignment of each chunk to a corresponding mobile device included in mobile devices 108-1, . . . , 108-N (see FIG. 1), where the chunks will be downloaded by the corresponding mobile devices.

Bandwidth pooling manager 104 (see FIG. 1) determines sizes of portions 114-1, . . . , 114-N of content 110 (see FIG. 1) to be downloaded to respective mobile devices 108-1, . . . , 108-N. Bandwidth pooling manager 104 (see FIG. 1) starts downloading bits of portion 114-1 (see FIG. 1) of content 110 (see FIG. 1) with a pre-buffer of a predetermined size (e.g., 1 MB) (also known as "pre-buffer size"). In response to bandwidth pooling manager 104 (see FIG. 1) determining that the end of the download of portion 114-1 (see FIG. 1) is approaching (i.e., will occur within a predetermined amount of time), bandwidth pooling manager 104 (see FIG. 1) compares the last amount of download having the pre-buffer size, and matches the pattern of the following amount of download having the pre-buffer size and which is to be downloaded to the next mobile device. Bandwidth pooling manager 104 (see FIG. 1) determines that synchronization has occurred and in response, bandwidth pooling manager 104 (see FIG. 1) coordinates a hand-off to the next mobile device. The aforementioned process repeats for the downloads of the other portions of content 110 (see FIG. 1) to the other mobile devices.

Cognitive Detection

FIG. 3 is a flowchart of a process of managing bandwidth pooling based on cognitive detection, where the process includes the process of FIG. 2 and is implemented in the system of FIG. 1, in accordance with embodiments of the present invention. The process of FIG. 3 begins at step 300. In step 302, bandwidth pooling manager 104 (see FIG. 1) performs the steps of FIG. 2. In one embodiment, step 202 (see FIG. 2) includes registering mobile devices 108-1, . . . , 108-N (see FIG. 1) of users 1, . . . , N, respectively, in an ad hoc group, where each of the users has a data plan indicating a prepaid bandwidth entitlement and add-on entitlements that cost additional fees. The users register their mobile devices in the ad hoc group in order to complete a large bandwidth consuming activity where the bandwidth consumption is spread across the members of the group.

After step 302, bandwidth pooling manager 104 (see FIG. 1) configures the application providing the content. In one embodiment, bandwidth pooling manager 104 (see FIG. 1) configures each of mobile devices 108-1, . . . , 108-N (see FIG. 1) to be a single thread in a multi-thread download of install images, video content, or other large content. Bandwidth pooling manager 104 coordinates a push of the content to a single node for aggregation and use (i.e., presentation of the content). In another embodiment, bandwidth pooling manager 104 (see FIG. 1) configures each of mobile devices 108-1, . . . , 108-N (see FIG. 1) to stream content, in turn handing off from one mobile device to another mobile device. The content consumption can be on a fixed central device such as a television or display enabled with a wireless communication protocol, or shared among all of the mobile devices 108-1, . . . , 108-N (see FIG. 1) for personal viewing on each mobile device.

After the formation of the ad hoc group, step 208 (see FIG. 2) includes each user committing to contributing bandwidth based on the user's consumption of the content. In one embodiment, a user sets a limit for total bandwidth consumed or a limit on the relative percentage the user contributes. For example, a user indicates that if the user has contributed 500 MB, then bandwidth pooling manager 104 (see FIG. 1) automatically stops the contribution of the user. As another, alternative example, if the ad hoc group has reduced its membership such that the user is now contributing more than half the bandwidth, then bandwidth pooling manager 104 (see FIG. 1) automatically stops the contribution of the user.

In step 304, bandwidth pooling manager 104 (see FIG. 1) detects an interruption of a user's cognitive detection of content 110 (see FIG. 1), which is being presented on content presentation device 106 (see FIG. 1) as a result of step 216 (see FIG. 2), where the user is one of the users who operate the mobile devices 108-1, . . . , 108-N (see FIG. 1) registered in step 202 (see FIG. 2).

In step 304 and step 310, which is described below, bandwidth pooling manager 104 (see FIG. 1) monitors and determines the relative consumption of the event by the users by, for example, (1) GPS tracking of the users in relation to a viewing area of content presentation device 106 (see FIG. 1), (2) detecting an activation or a deactivation of the content 110 (see FIG. 1) for viewing on a user's mobile device, (3) detecting a user's departure from the ad hoc group by choice (i.e., the user opts-out), (4) determining that the user's mobile device is out of range of the local device network that links the mobile devices, or (5) receiving an indication from face detection camera(s) installed on content presentation device 106 (see FIG. 1) about whether the face of a user is detected in the viewing area of content presentation device 106 (see FIG. 1).

In response to detecting an interruption of cognitive detection by a user in step 304 and reducing the user's bandwidth contribution, bandwidth pooling manager 104 (see FIG. 1) adjusts the user's relative bandwidth contribution downward or eliminates the user's contribution (i.e., the user's mobile device is removed from the ad hoc group).

If the ad hoc group is reduced, bandwidth pooling manager 104 (see FIG. 1) monitors whether the ad hoc group is running out of the contributed bandwidth in pool contributions 112-1, . . . , 112-N (see FIG. 1). If the ad hoc group is running out of the contributed bandwidth, then bandwidth pooling manager 104 (see FIG. 1) polls the users whose mobile devices remain in the ad hoc group to inquire whether the users agree to contributing additional bandwidth. If the users do not agree to contributing the additional bandwidth, then bandwidth pooling manager 104 (see FIG. 1) terminates the ad hoc group and the presentation of content 110 (see FIG. 1) on content presentation device 106 (see FIG. 1).

In step 306, bandwidth pooling manager 104 (see FIG. 1) determines an amount of time during which the interruption detected in step 304 occurs.

In step 308, based on the amount of time determined in step 306, bandwidth pooling manager 104 (see FIG. 1) updates the bandwidth contributions originally determined in step 208 (see FIG. 2) by (1) proportionately decreasing the bandwidth contribution of the mobile device utilized by the user whose cognitive detection is interrupted and (2) proportionally increasing the bandwidth contribution(s) of the other mobile device(s) registered in step 202 (see FIG. 2).

In step 310, bandwidth pooling manager 104 (see FIG. 1) detects whether the user's cognitive detection of content 110 (see FIG. 1) being presented on content presentation device 106 (see FIG. 1) has been resumed. If bandwidth pooling manager 104 (see FIG. 1) determines in step 310 a resumption of the user's cognitive detection of content 110 (see FIG. 1) on content presentation device 106 (see FIG. 1), then the Yes branch of step 310 is taken and step 312 is performed.

In step 312, bandwidth pooling manager 104 (see FIG. 1) restores the original bandwidth contributions that had been originally determined in step 208 (see FIG. 2).

Returning to step 310, if bandwidth pooling manager 104 (see FIG. 1) determines that there is no resumption of the user's cognitive detection of content 110 (see FIG. 1) on content presentation device 106 (see FIG. 1), then the No branch of step 310 is taken and step 314 is performed.

In step 314, bandwidth pooling manager 104 (see FIG. 1) maintains the bandwidth contributions that were updated in step 308.

Following step 312 and step 314, the process of FIG. 3 ends at step 316.

As one example, a group of four friends want to watch a sporting event while also enjoying a day at a lake. Instead of all four friends streaming the same event over their four smartphones, where the total amount of data used by the four smartphones is four times the amount data in the streaming of the event, the shared approach described in the process of FIG. 2 is leveraged so that a distributed rotation of downloads among the four smartphones is utilized so that a presentation of the event is made available to all four friends. In this example, the four smartphones are in communication with a portable television via a wireless communication protocol. Each of the four friends agrees to provide an equal share of the download and bandwidth pooling manager 104 (see FIG. 1) configures system 100 (see FIG. 1) to round robin the shares of the download sequentially among the four smartphones. During the presentation of the event on the portable television, one of the friends (i.e., Friend F) becomes involved in helping his children with their fishing off of a dock that is far from the viewing area of the portable television. Bandwidth pooling manager 104 (see FIG. 1) receives an indication that Friend F is away from the viewing area for 30 minutes (e.g., using a GPS system indicating that a location of Friend F is at least a threshold distance from the location of the portable television, or using a face detection camera coupled to the portable television which does not detect the face of Friend F). Since Friend F is away from the viewing area for 30 minutes, bandwidth pooling manager 104 (see FIG. 1) reduces the contribution of Friend F proportionally for the time he is away from the viewing area. In response to detecting Friend F's return to the viewing area, bandwidth pooling manager 104 (see FIG. 1) restores the contribution of Friend F to be equal to the contributions of the other three friends over the time Friend F was present and participating with the consumption of the content. By this proportionate reduction of the contribution and the later restoration of equal contributions, bandwidth pooling manager 104 (see FIG. 1) allows an equitable usage of data based on an actual value that each friend derived from viewing the event (i.e., based on an amount of time that each of the friends had a cognitive focus on the event).

EXAMPLE

Figure 4A:
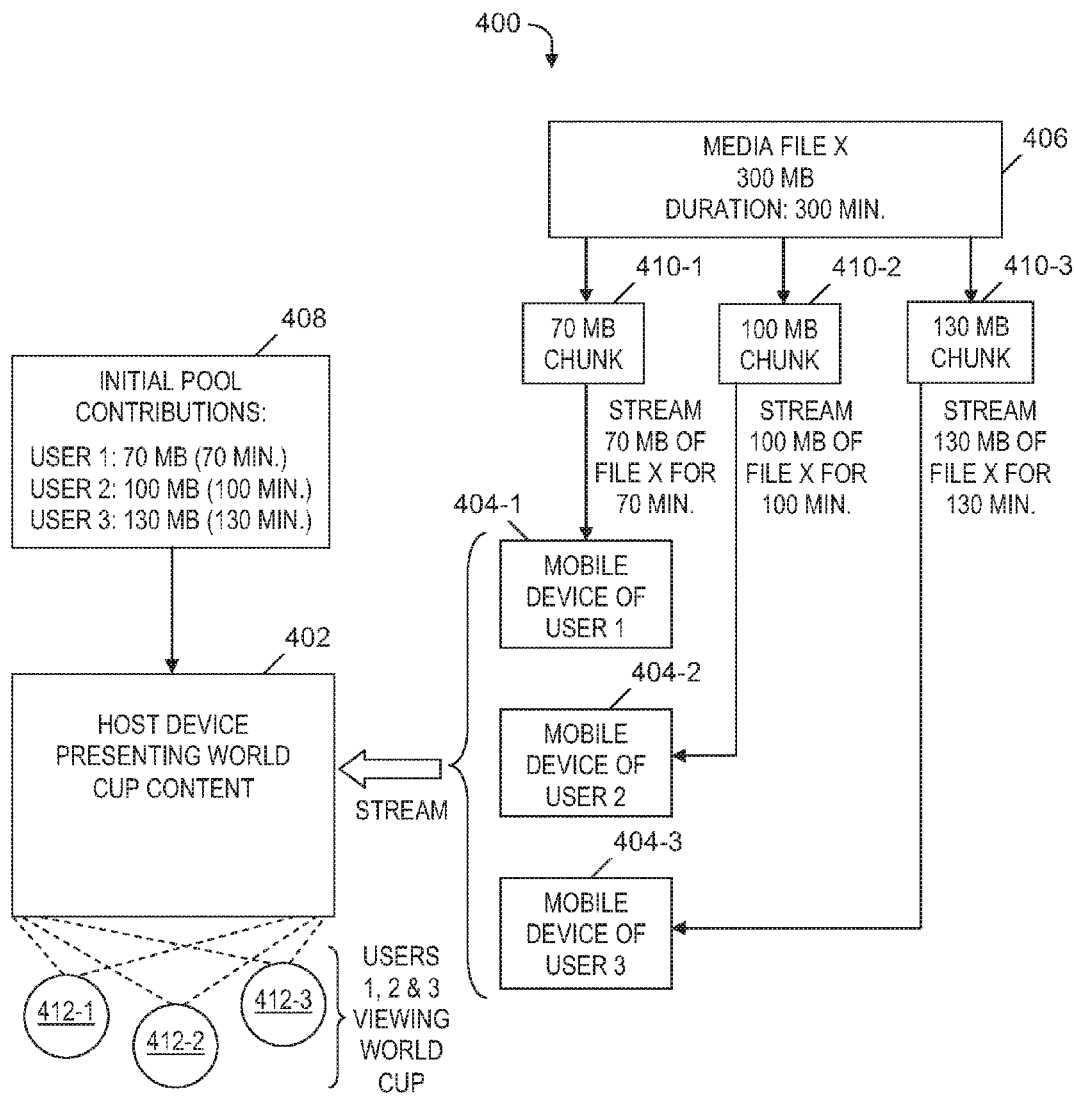
FIGS. 4A-4B depict an example of managing bandwidth pooling based on cognitive detection using the process of FIG. 3, in accordance with embodiments of the present invention.
Figure 4B:
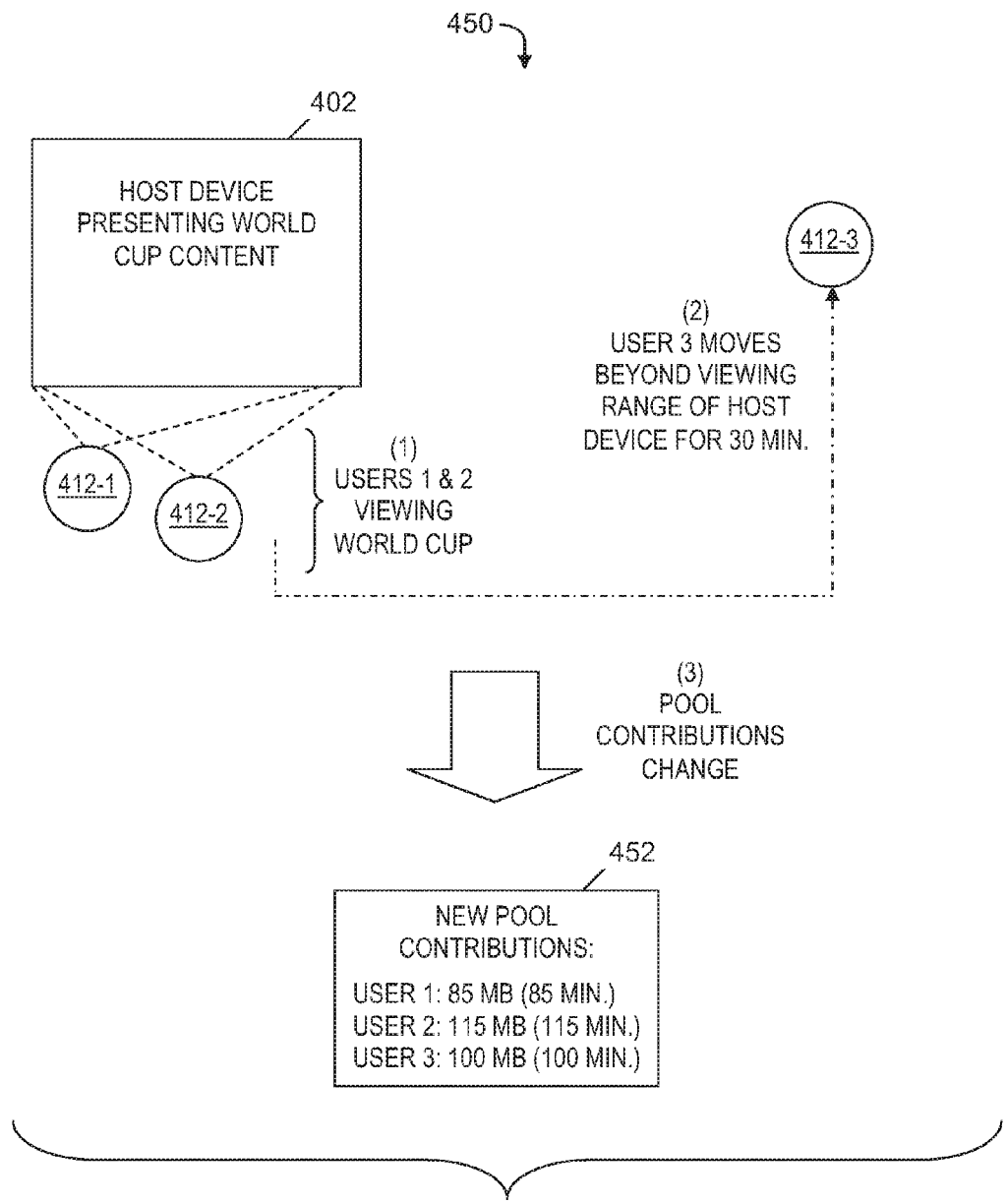

FIGS. 4A-4B depict an example of managing bandwidth pooling based on cognitive detection using the process of FIG. 3, in accordance with embodiments of the present invention. A first portion 400 of the example of FIGS. 4A-4B depicts a host device 402 (i.e., content presentation device 106 in FIG. 1) connected to three mobile devices 404-1, 404-2, and 404-3 (i.e., the N mobile devices in FIG. 1) to receive streamed content from media file 406 (also known in this example as media file X; i.e., content 110 in FIG. 1), where the mobile devices 404-1, 404-2, and 404-3 are operated by User 1, User 2, and User 3, respectively. Mobile devices 404-1, 404-2, and 404-3 are registered in an ad hoc group in step 202 (see FIG. 2). Media file 406, which has a size of 300 megabytes (MB) and a streamed duration of 300 minutes, includes the World Cup sporting event. Host device 402 includes the aggregator device 102 (see FIG. 1) (not shown in FIG. 4A) running bandwidth pooling manager 104 (see FIG. 1). Bandwidth pooling manager 104 (see FIG. 1) receives in step 204 (see FIG. 2) information about data plans for mobile devices 404-1, 404-2, and 404-3, which includes amounts of data remaining to be used in billing cycles of the data plans, numbers of days remaining in the billing cycles, and current velocities of data usage of mobile devices 404-1, 404-2, and 404-3.

Bandwidth pooling manager 104 (see FIG. 1) in step 208 (see FIG. 2) determines initial pool contributions 408 based on the aforementioned data plan information. The initial pool contributions 408 indicate that User 1 is initially committed to contribute 70 MB of data for 70 minutes of streaming via the data plan of mobile device 404-1; User 2 is initially committed to contribute 100 MB of data for 100 minutes of streaming via the data plan of mobile device 404-2; and User 3 is committed to contribute 130 MB of data for 130 minutes of streaming via the data plan of mobile device 404-3. The contributions included in initial pool contributions 408 are examples of pool contributions 112-1, . . . , 112-N (see FIG. 1).

Bandwidth pooling manager 104 (see FIG. 1) in step 212 (see FIG. 2) determines that a first chunk of data 410-1 of size 70 MB of media file X is scheduled to be streamed first to mobile device 404-1 in a first specified time period having a duration of 70 minutes, a second chunk of data 410-2 of size 100 MB of media file X is scheduled to be streamed second to mobile device 404-2 in a second specified time period having a duration of 100 minutes; and a third chunk of data 410-3 of size 130 MB of media file X is scheduled to be streamed third to mobile device 404-3 in a third specified time period having a duration of 130 minutes.

In first portion 400 of the example of FIGS. 4A-4B, Users 1, 2, and 3 (i.e., users 412-1, 412-2, and 412-3, respectively) are simultaneously viewing the World Cup sporting event on host device 402 during the first specified time period of 70 minutes, during which a 70 MB chunk of media file X is streamed to host device 402 via mobile device 404-1.

In a second portion 450 in FIG. 4B depicts host device 402 presenting the World Cup sporting event in a time period later than the time period depicted in first portion 400 (see FIG. 4A). At this later time period depicted in portion 450, only users 412-1 and 412-2 are viewing the World Cup. User 412-3 is no longer viewing the World Cup on the host device 402 because user 412-3 moves to a new location beyond the viewing range of host device 402. User 412-3 is in the new location for 30 minutes and then returns to the user's original location which is within the viewing range of host device 402. Thus, the cognitive detection of the World Cup by user 412-3 is interrupted for the 30 minutes during which the user is in the new location. Bandwidth pooling manager 104 (see FIG. 1) detects the interruption of the cognitive detection of user 412-3 in step 304 (see FIG. 3).

In step 308 (see FIG. 3), bandwidth pooling manager 104 (see FIG. 1) determines new pool contributions 452, which includes decreasing the contribution of user 412-3 by 30 MB, and an increase of the other two users by 15 MB each, for a total increase of 30 MB to offset the aforementioned decrease of 30 MB for user 412-3 (i.e., increase the contribution of user 412-1 by 15 MB and increase the contribution of user 412-2 by 15 MB). Thus, in new pool contributions 452, the contribution of user 412-1 is updated to 85 MB of data in 85 minutes of streaming, the contribution of user 412-2 is updated to 115 MB of data in 115 minutes of streaming, and the contribution of user 412-3 is updated to 100 MB of data in 100 minutes of streaming. New pool contributions 452 are subsequent examples of pool contributions 112-1, . . . , 112-N (see FIG. 1). Dividing the 30 MB increase into two equal 15 MB increases for user 412-1 and user 412-2 is only one example of an algorithm for dividing the 30 MB increase between users 412-1 and 412-2. Instead of dividing the increase into equal portions, alternate algorithms may be used. As a variation of the preceding example which uses an alternate algorithm, new pool contributions 452 may be determined by dividing the increase of 30 MB proportionally into approximately 12 MB and 18 MB, which are amounts based on the original 70 MB to 100 MB ratio of the original contributions from user 412-1 and user 412-2. Using the aforementioned alternate algorithm, the new contributions from users 412-1 and 412-2 are the original contributions of users 412-1 and 412-2 increased by approximately 12 MB and 18 MB, respectively. That is, the new contribution of user 412-1 is 82 MB (i.e., 70 MB+12 MB) and the new contribution of user 412-2 is 118 MB (i.e., 100 MB+18 MB).

Computer System

FIG. 5 is a block diagram of a computer that is included in the system of FIG. 1 and that implements the processes of FIG. 2 and FIG. 3, in accordance with embodiments of the present invention. Computer 500 is a computer system that generally includes a central processing unit (CPU) 502, a memory 504, an input/output (I/O) interface 506, and a bus 508. In one embodiment, computer 500 is aggregator device 102 (see FIG. 1). Further, computer 500 is coupled to I/O devices 510 and a computer data storage unit 512. CPU 502 performs computation and control functions of computer 500, including executing instructions included in program code 514 to perform a method of managing bandwidth pooling, where the instructions are carried out by CPU 502 via memory 504. CPU 502 may include a single processing unit, or be distributed across one or more processing units in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are carried out. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display device, keyboard, etc. Bus 508 provides a communication link between each of the components in computer 500, and may include any type of transmission link, including electrical, optical, wireless, etc.

I/O interface 506 also allows computer 500 to store information (e.g., data or program instructions such as program code 514) on and retrieve the information from computer data storage unit 512 or another computer data storage unit (not shown). Computer data storage unit 512 includes a known computer-readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are executed by CPU 502 via memory 504 to manage bandwidth pooling. Although FIG. 5 depicts memory 504 as including program code 514, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

Storage unit 512 and/or one or more other computer data storage units (not shown) that are coupled to computer 500 may store pool contributions 112-1, . . . , 112-N (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to managing bandwidth pooling. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 500) including one or more processors (e.g., CPU 502), wherein the processor(s) carry out instructions contained in the code causing the computer system to manage bandwidth pooling. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of managing bandwidth pooling.

While it is understood that program code 514 for managing bandwidth pooling may be deployed by manually loading directly in client, server and proxy computers (not shown) via loading a computer-readable storage medium (e.g., computer data storage unit 512), program code 514 may also be automatically or semi-automatically deployed into computer 500 by sending program code 514 to a central server or a group of central servers. Program code 514 is then downloaded into client computers (e.g., computer 500) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of managing bandwidth pooling. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 500). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 500) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIG. 3) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 500) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 500), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of pooling bandwidth provided by mobile devices, the method comprising the steps of:
    based on data plans provided by wireless carriers to the mobile devices, amounts of data remaining to be used in billing cycles specified by the data plans, numbers of days remaining to be used in the billing cycles, and current velocities of data usage by the mobile devices, a computer estimating amounts of data that will be unused by the mobile devices at the end of the respective billing cycles;
    based on the estimated amounts, the computer determining contributions of data from the respective mobile devices so that the contributions of data do not exceed the respective estimated amounts;
    the computer determining capabilities of the mobile devices, including radio interface, signal to noise ratio, signal strength, effective transmission rate, and battery life of each mobile device;
    based on the capabilities of the mobile devices, the computer determining time periods during which the respective mobile devices are subscripted for providing at least some of the respective contributions of data;
    the computer coordinating hand-offs among the mobile devices, including instructing the mobile devices to start and stop collections of data from a streaming or a downloading of content during the respective time periods and in amounts not exceeding the respective contributions, the hand-offs providing a cooperative usage of the bandwidth among the mobile devices which minimizes redundant streaming or downloading of the content to more than one of the mobile devices; and
    in response to the step of coordinating the hand-offs, the computer presenting the streamed or downloaded content on a display device and to an ad hoc group of the mobile devices.

2. The method of claim 1, further comprising the step of the computer registering the mobile devices into the ad hoc group, the mobile devices being operated by respective users, and the computer connected to the mobile devices and to the display device.

3. The method of claim 1, further comprising the step of via the mobile devices, the computer querying accounts of users operating the mobile devices, the accounts managed by the wireless carriers, and in response to the step of querying the accounts, the computer receiving specifications of the data plans, the amounts of data remaining to be used in the billing cycles, the numbers of days remaining in the billing cycles, and the current velocities of data usage by the mobile devices.

4. The method of claim 1, further comprising the steps of:
    the computer determining that a cognitive detection of a user has changed from viewing the content on the display device to no longer viewing the content on the display device, wherein the user operates a mobile device included in the mobile devices;
    based on the user no longer viewing the content, the computer decreasing a contribution of data from the mobile device operated by the user by a first amount, wherein the contribution is included in the contributions;
    based on the decreased contribution, the computer polling one or more other users to request an increase in one or more contributions of data from one or more other mobile devices operated by the one or more other users, the increase in the one or more contributions collectively equaling or exceeding the first amount; and
    in response to the step of polling, if the one or more other users approve of the increase in the one or more contributions, the computer increasing the one or more contributions by the approved increase and adjusting the hand-offs so that the one or more other mobile devices operated by the one or more other users start and stop collections of data from the streaming or downloading of the content in one or more amounts equaling the respective increased one or more contributions, or if the one or more other users do not approve the increase, the computer terminating the ad hoc group so that the streaming or downloading of the content is not completed.

5. The method of claim 4, further comprising the steps of:
    in response to the step of determining the cognitive detection of the user has changed, the computer determining an amount of time during which the user does not view the content;

the computer determining the first amount to be proportional to the amount of time during which the user does not view the content; and the computer determining the increase in the one or more contributions to be proportional to the amount of time during which the user does not view the content.

6. The method of claim 4, further comprising the steps of:

the computer determining that the one or more other users approve of the increase in the one or more contributions;

subsequent to the steps of increasing the one or more contributions and adjusting the hand-offs, the computer determining that the cognitive detection of the user has changed again from not viewing the content on the display device to again viewing the content on the display device; and based on the user again viewing the content, the computer restoring the original contributions of data from the mobile devices, including the mobile device operated by the user, wherein the original contributions had been determined by the step of determining the contributions of data from the respective mobile devices so that the contributions of data do not exceed the respective estimated amounts.

7. The method of claim 4, further comprising the steps of:

the computer receiving a maximum contribution of data from another mobile device included in the mobile devices, the maximum contribution being an amount of data or a percentage of data collectively included the increased one or more contributions; and the computer determining the increase in the one or more contributions so that another contribution of data from the other mobile device does not exceed the maximum contribution.

8. The method of claim 1, wherein the step of coordinating the hand-offs includes the steps of:

the computer multiplexing a signal of the streamed content so that a first mobile device buffers a tail end of a break point and a second mobile device buffers a front end of the break point; and the computer demuxing the signal and pulling the content for a time period during which the second mobile device is subscripted for providing a contribution of data, wherein the time period is included in the time periods and the contribution is included in the contributions.

9. The method of claim 1, further comprising the steps of:

the computer determining a sequence of the time periods;

the computer determining (1) a download speed of a mobile device is slower than download speeds of other mobile devices included in the mobile devices, (2) a contribution of data from the mobile device is larger than contributions of data from the other mobile devices and the mobile device indicated that the mobile device will remain in the ad hoc group until all of the content is streamed or downloaded, or (3) the mobile device indicated the mobile device will leave the ad hoc group before the content has completed streaming or downloading; and based on the download speed of the mobile device being slower than the download speeds of other mobile devices, the contribution of data from the mobile device being larger than the contributions of data from the other mobile devices, or the mobile device leaving the ad hoc group before the content has completed streaming or downloading, the computer placing a time period during which the mobile device is subscripted for providing the contribution of data at a start of the sequence of time periods.

10. The method of claim 1, further comprising the steps of:

the computer generating a wireless communication pathway among the mobile devices;

the computer electing one mobile device included in the mobile devices to be a master device and designating other mobile devices included in the mobile devices as slave devices;

the computer sending each slave device a specification of data which will be streamed or downloaded; and the computer sending signals to the slave devices to start and stop collections of the data being streamed or downloaded.

11. The method of claim 1, further comprising the step of:

providing at least one support service for at least one of creating, integrating, hosting, maintaining, and deploying computer-readable program code in the computer, the program code being executed by a processor of the computer to implement the steps of estimating the amounts of data that will be unused, determining the contributions, determining the capabilities, determining the time periods, coordinating the hand-offs, and presenting the content.

12. A computer program product, comprising:

a computer-readable, storage device; and a computer-readable program code stored in the computer-readable, storage device, the computer-readable program code containing instructions that are executed by a central processing unit (CPU) of a computer system to implement a method of pooling bandwidth provided by mobile devices, the method comprising the steps of:

based on data plans provided by wireless carriers to the mobile devices, amounts of data remaining to be used in billing cycles specified by the data plans, numbers of days remaining to be used in the billing cycles, and current velocities of data usage by the mobile devices, the computer system estimating amounts of data that will be unused by the mobile devices at the end of the respective billing cycles;

based on the estimated amounts, the computer system determining contributions of data from the respective mobile devices so that the contributions of data do not exceed the respective estimated amounts;

the computer system determining capabilities of the mobile devices, including radio interface, signal to noise ratio, signal strength, effective transmission rate, and battery life of each mobile device;

based on the capabilities of the mobile devices, the computer system determining time periods during which the respective mobile devices are subscripted for providing at least some of the respective contributions of data;

the computer system coordinating hand-offs among the mobile devices, including instructing the mobile devices to start and stop collections of data from a streaming or a downloading of content during the respective time periods and in amounts not exceeding the respective contributions, the hand-offs providing a cooperative usage of the bandwidth among the mobile devices which minimizes redundant streaming or downloading of the content to more than one of the mobile devices; and in response to the step of coordinating the hand-offs, the computer system presenting the streamed or downloaded content on a display device and to an ad hoc group of the mobile devices.

13. The computer program product of claim 12, wherein the method further comprises the steps of:
the computer system determining that a cognitive detection of a user has changed from viewing the content on the display device to no longer viewing the content on the display device, wherein the user operates a mobile device included in the mobile devices;
based on the user no longer viewing the content, the computer system decreasing a contribution of data from the mobile device operated by the user by a first amount, wherein the contribution is included in the contributions;
based on the decreased contribution, the computer system polling one or more other users to request an increase in one or more contributions of data from one or more mobile devices operated by the one or more other users, the increase in the one or more contributions collectively equaling or exceeding the first amount; and
in response to the step of polling, if the one or more other users approve of the increase in the one or more contributions, the computer system increasing the one or more contributions by the approved increase and adjusting the hand-offs so that the one or more other mobile devices operated by the one or more other users start and stop collections of data from the streaming or downloading of the content in one or more amounts equaling the respective increased one or more contributions, or if the one or more other users do not approve the increase, the computer system terminating the ad hoc group so that the streaming or downloading of the content is not completed.

14. The computer program product of claim 13, wherein the method further comprises the steps of:
in response to the step of determining the cognitive detection of the user has changed, the computer system determining an amount of time during which the user does not view the content;
the computer system determining the first amount to be proportional to the amount of time during which the user does not view the content; and
the computer system determining the increase in the one or more contributions to be proportional to the amount of time during which the user does not view the content.

15. The computer program product of claim 13, wherein the method further comprises the steps of:
the computer system determining the one or more other users approve of the increase in the one or more contributions;
subsequent to the steps of increasing the one or more contributions and adjusting the hand-offs, the computer system determining that the cognitive detection of the user has changed again from not viewing the content on the display device to again viewing the content on the display device; and
based on the user again viewing the content, the computer system restoring the original contributions of data from the mobile devices, including the mobile device operated by the user, wherein the original contributions had been determined by the step of determining the contributions of data from the respective mobile devices so that the contributions of data do not exceed the respective estimated amounts.

16. The computer program product of claim 13, wherein the method further comprises the steps of:
the computer system receiving a maximum contribution of data from another mobile device included in the mobile devices, the maximum contribution being an amount of data or a percentage of data collectively included the increased one or more contributions; and
the computer system determining the increase in the one or more contributions so that another contribution of data from the other mobile device does not exceed the maximum contribution.

17. The computer program product of claim 12, wherein the step of coordinating the hand-offs includes the steps of:
the computer system multiplexing a signal of the streamed content so that a first mobile device buffers a tail end of a break point and a second mobile device buffers a front end of the break point; and
the computer system demuxing the signal and pulling the content for a time period during which the second mobile device is subscripted for providing a contribution of data, wherein the time period is included in the time periods and the contribution is included in the contributions.

18. The computer program product of claim 12, wherein the method further comprises the steps of:
the computer system determining a sequence of the time periods;
the computer system determining (1) a download speed of a mobile device is slower than download speeds of other mobile devices included in the mobile devices, (2) a contribution of data from the mobile device is larger than contributions of data from the other mobile devices and the mobile device indicated that the mobile device will remain in the ad hoc group until all of the content is streamed or downloaded, or (3) the mobile device indicated the mobile device will leave the ad hoc group before the content has completed streaming or downloading; and
based on the download speed of the mobile device being slower than the download speeds of other mobile devices, the contribution of data from the mobile device being larger than the contributions of data from the other mobile devices, or the mobile device leaving the ad hoc group before the content has completed streaming or downloading, the computer system placing a time period during which the mobile device is subscripted for providing the contribution of data at a start of the sequence of time periods.

19. The computer program product of claim 12, wherein the method further comprises the steps of:
the computer system generating a wireless communication pathway among the mobile devices;
the computer system electing one mobile device included in the mobile devices to be a master device and designating other mobile devices included in the mobile devices as slave devices;
the computer system sending each slave device a specification of data which will be streamed or downloaded; and
the computer system sending signals to the slave devices to start and stop collections of the data being streamed or downloaded.

20. A computer system comprising:
a central processing unit (CPU);
a memory coupled to the CPU; and
a computer readable storage device coupled to the CPU, the storage device containing instructions that are executed by the CPU via the memory to implement a method of pooling bandwidth provided by mobile devices, the method comprising the steps of:

based on data plans provided by wireless carriers to the mobile devices, amounts of data remaining to be used in billing cycles specified by the data plans, numbers of days remaining to be used in the billing cycles, and current velocities of data usage by the mobile devices, the computer system estimating amounts of data that will be unused by the mobile devices at the end of the respective billing cycles;

based on the estimated amounts, the computer system determining contributions of data from the respective mobile devices so that the contributions of data do not exceed the respective estimated amounts;

the computer system determining capabilities of the mobile devices, including radio interface, signal to noise ratio, signal strength, effective transmission rate, and battery life of each mobile device;

based on the capabilities of the mobile devices, the computer system determining time periods during which the respective mobile devices are subscripted for providing at least some of the respective contributions of data;

the computer system coordinating hand-offs among the mobile devices, including instructing the mobile devices to start and stop collections of data from a streaming or a downloading of content during the respective time periods and in amounts not exceeding the respective contributions, the hand-offs providing a cooperative usage of the bandwidth among the mobile devices which minimizes redundant streaming or downloading of the content to more than one of the mobile devices; and in response to the step of coordinating the hand-offs, the computer system presenting the streamed or downloaded content on a display device and to an ad hoc group of the mobile devices.

21. The computer system of claim 20, wherein the method further comprises the steps of:

the computer system determining that a cognitive detection of a user has changed from viewing the content on the display device to no longer viewing the content on the display device, wherein the user operates a mobile device included in the mobile devices;

based on the user no longer viewing the content, the computer system decreasing a contribution of data from the mobile device operated by the user by a first amount, wherein the contribution is included in the contributions;

based on the decreased contribution, the computer system polling one or more other users to request an increase in one or more contributions of data from one or more mobile devices operated by the one or more other users, the increase in the one or more contributions collectively equaling or exceeding the first amount; and in response to the step of polling, if the one or more other users approve of the increase in the one or more contributions, the computer system increasing the one or more contributions by the approved increase and adjusting the hand-offs so that the one or more other mobile devices operated by the one or more other users start and stop collections of data from the streaming or downloading of the content in one or more amounts equaling the respective increased one or more contributions, or if the one or more other users do not approve the increase, the computer system terminating the ad hoc group so that the streaming or downloading of the content is not completed.

22. The computer system of claim 21, wherein the method further comprises the steps of:

in response to the step of determining the cognitive detection of the user has changed, the computer system determining an amount of time during which the user does not view the content;

the computer system determining the first amount to be proportional to the amount of time during which the user does not view the content; and the computer system determining the increase in the one or more contributions to be proportional to the amount of time during which the user does not view the content.

23. The computer system of claim 21, wherein the method further comprises the steps of:

the computer system determining that the one or more other users approve of the increase in the one or more contributions;

subsequent to the steps of increasing the one or more contributions and adjusting the hand-offs, the computer system determining that the cognitive detection of the user has changed again from not viewing the content on the display device to again viewing the content on the display device; and based on the user again viewing the content, the computer system restoring the original contributions of data from the mobile devices, including the mobile device operated by the user, wherein the original contributions had been determined by the step of determining the contributions of data from the respective mobile devices so that the contributions of data do not exceed the respective estimated amounts.

24. The computer system of claim 21, wherein the method further comprises the steps of:

the computer system receiving a maximum contribution of data from another mobile device included in the mobile devices, the maximum contribution being an amount of data or a percentage of data collectively included the increased one or more contributions; and the computer system determining the increase in the one or more contributions so that another contribution of data from the other mobile device does not exceed the maximum contribution.

25. The computer system of claim 20, wherein the step of coordinating the hand-offs includes the steps of:

the computer system multiplexing a signal of the streamed content so that a first mobile device buffers a tail end of a break point and a second mobile device buffers a front end of the break point; and the computer system demuxing the signal and pulling the content for a time period during which the second mobile device is subscripted for providing a contribution of data, wherein the time period is included in the time periods and the contribution is included in the contributions.

* * * * *